United States Patent [19]

Bentley et al.

[11] 4,102,846
[45] Jul. 25, 1978

[54] STABLE DISPERSIONS OF POLYMER PARTICLES CONTAINING SUB-PARTICLES OF A SOLID MODIFYING AGENT AND PROCESS FOR MAKING SAME

[75] Inventors: John Bentley; Morice William Thompson, both of Maidenhead, England

[73] Assignee: Imperial Chemical Industries Limited, United Kingdom

[21] Appl. No.: 767,148

[22] Filed: Feb. 9, 1977

[30] Foreign Application Priority Data

Feb. 19, 1976 [GB] United Kingdom ............... 6613/76

[51] Int. Cl.$^2$ ............................................... C08K 5/10
[52] U.S. Cl. ........................ 260/31.2 N; 260/31.2 R; 260/31.2 XA; 260/32.8 R; 260/32.8 N; 260/33.4 R; 260/33.6 R; 260/34.2
[58] Field of Search ................ 260/31.2 N, 31.2 XA, 260/32.8 R, 32.8 N, 33.4 R, 33.6 R, 34.2

[56] References Cited

U.S. PATENT DOCUMENTS

| 3,876,603 | 4/1975 | Makhlouf | 260/34.2 |
| 3,935,155 | 1/1976 | Osmond et al. | 260/34.2 |
| 3,985,700 | 10/1976 | Nicks et al. | 260/34.2 |

OTHER PUBLICATIONS

Barrett, Dispersion Polymerization in Organic Media, Wiley, N.Y. (1975), p. 286.
Dow Corning Technical Bulletin, "Silane Coupling Agents" (received by PTO Oct., 1967), pp. 18–19.

Primary Examiner—Lewis T. Jacobs
Attorney, Agent, or Firm—Cushman, Darby & Cushman

[57] ABSTRACT

A process for manufacturing a stable dispersion in an organic liquid of particles consisting of (a) a polymer insoluble in the liquid and formed by polymerization of monomer(s) at least one of which is solid at the polymerization temperature and (b) sub-particles of a solid modifying agent for the polymer, the process comprising dispersing the solid monomer and the modifying agent together in the liquid in the presence of a specified dispersing agent so as to form a stable dispersion of solid particles not larger than 50μ, and heating the dispersion together with any other monomers required, so as to bring about polymerization, in the presence of a specified stabilizing agent for the polymer formed. The functions of dispersing agent and stabilizing agent may be combined in a single substance.

22 Claims, No Drawings

STABLE DISPERSIONS OF POLYMER PARTICLES CONTAINING SUB-PARTICLES OF A SOLID MODIFYING AGENT AND PROCESS FOR MAKING SAME

This invention relates to the production of dispersions of particles of polymer which incorporate within the particles solid modifying agents such as pigments, dyestuffs, fillers or extenders, and to polymer particles so modified.

A process has already been proposed in U.S. Pat. No. 3,935,155 for producing a stable dispersion of particles of a polymer in an inert organic liquid medium in which the polymer is insoluble, by polymerising in the liquid one or more monomers one of which is solid at the polymerisation temperature and of limited solubility in the organic liquid at that temperature, and is initially brought into a state of finely divided particles stably dispersed in the liquid. The process requires the presence of a monomer-stabilising agent whereby the finely divided monomer particles are held in stable dispersion in the liquid, and of a polymer-stabilising agent whereby the polymer particles formed therefrom are similarly held in stable dispersion in the final product. The process of U.S. Pat. No. 3,935,155 is proposed as an alternative to known dispersion polymerisation techniques in which one or more monomers are polymerised in an organic liquid in which they are soluble but the resulting polymer is insoluble, in the presence of a steric stabilising agent, or in which the monomer or monomers are first emulsified in the liquid state in an organic liquid in which both they and the resulting polymer are insoluble, and polymerisation is then effected, again in the presence of a steric stabilising agent. These latter techniques present difficulties with monomers which are insoluble in most common organic liquids, or which either have very high melting points or tend to polymerise before the temperature required in order to emulsify them in the molten condition can be reached. Such monomers are most frequently encountered in the preparation of dispersions of condensation polymers.

We have now found that this process of U.S. Pat. No. 3,935,155 may be adapted so that at least a high proportion of the particles present in the final dispersion consist not of polymer alone but of polymer having incorporated within it sub-particles of a solid modifying agent as referred to above.

According to the present invention there is provided a process for the manufacture of a stable dispersion in an inert organic liquid medium of particles consisting of (a) a polymer which is insoluble in that medium, the polymer being obtained by the polymerisation of one or more reactive monomers at least one of which (hereinafter referred to as an insoluble solid monomer) has a melting point above the temperature at which the polymerisation reaction takes place and is insoluble in the liquid medium at that temperature, and (b) sub-particles within the polymer of a solid modifying agent for the polymer, the process comprising the steps of (1) dispersing the solid monomer or each solid monomer and the modifying agent together in the inert organic liquid medium in the presence of a dispersing agent for the monomer or monomers so as to produce a stable dispersion of particles of the monomer or monomers and of the modifying agent having a mean diameter not greater than $50\mu$, the dispersing agent being soluble in the inert organic liquid and incorporating (i) a polymeric component which is solvatable by the liquid and (ii) a grouping which is capable of becoming associated with the surface of the particles of solid monomer or monomers and (2) heating the dispersion of solid monomer or monomers and modifier at the polymerisation temperature so as to bring about the polymerisation reaction, in the presence of a polymer-stabilising agent which is soluble in the inert organic liquid and incorporates (a) a polymeric component which is solvatable by the liquid and (b) a grouping which is capable of effecting association with the surface of the particles of the resulting polymer as the polymer is formed.

By the use of the term 'soluble', in relation to the monomer-dispersing agents and polymer-stabilising agents discussed herein, we include both of the following situations: (a) where the agent is soluble in the organic liquid in the ordinary sense of being present in the solution as individual molecules and (b) where the agent is soluble in the liquid in the same sense as soap is soluble in water, that is to say where the solution contains both individual molecules of the agent and micellar aggregates of molecules of the agent is equilibrium with each other, and where the solution is infinitely dilutable with further solvent without the occurrence of phase separation.

By the term 'solvatable', in relation to a polymeric component of either the monomer-dispersing agent or the polymer-stabilising agent, we mean that the component in question would, if unattached to the remainder of the agent molecule, be soluble in the organic liquid in the ordinary sense of being present in the solution as individual molecules, without any tendency to form micelles.

In the specification of U.S. Pat. No. 3,935,155 an insoluble solid monomer is defined as one which has at most a very small solubility in the inert organic liquid, such that it is possible to procure initially a stable dispersion in the liquid of this monomer is finely divided particulate form and to maintain that stably dispersed state throughout the subsequent polymerisation reaction. This same definition is applicable to each insoluble solid monomer used according to the present invention. Although it is difficult to lay down precise solubility limits, it can be said that such a monomer will in general have a solubility of less than 1% in the organic liquid at the polymerisation temperature and will therefore be present overwhelmingly as a separate phase.

The process of the invention is suitable for the manufacture of dispersions of polymers from a single insoluble solid monomer as previously defined, or from an insoluble solid monomer together with one or more other monomers which are appreciably soluble in the organic liquid at the polymerisation temperature, that is to say which have a solubility of the order of 10% or more in the liquid at that temperature. Such other monomers (hereinafter termed "soluble monomers") may be either solid or liquid at the polymerisation temperature. It is applicable to both addition polymers and condensation polymers. In the case of addition polymers, where more than one monomer is employed these will normally contain polymerisable groups of the same type (for example, ethylenically unsaturated groups) and the product will be a copolymer; in the case of condensation polymers, polymerisable groups of two different but complementary types (for example hydroxyl groups and carboxyl groups) will normally be involved and, whilst these may both be present in a single monomer species, it will more frequently occur that one type of group is present in one monomer and the other type of group in a second monomer. For reasons already outlined, however, the process is of greatest value in the production of dispersions of condensation polymers, where difficulty processable solid monomers are more frequently encountered than with addition polymers.

The process of the invention may also be operated so as to produce a dispersion of modified particles of a copolymer, starting from two or more insoluble, solid monomers as previously defined each of which is capable of homopolymerisation. The production of copolymer dispersions in this way is more generally described in our copending U.S. Application Ser. No. 678,430, where it is suggested that the copolymers of which the disperse particles consist may be different in structure from those obtained from the same comonomers by copolymerisation in the melt or (where possible) in solution. By means of the present invention such copolymer particles can also be caused to incorporate solid modifying agents. Here again, for the reason stated above, the process is of greatest value in respect of condensation copolymer dispersions.

Where a soluble monomer which has an appreciable but not high solubility in the inert organic liquid and is solid at the polymerisation temperature is employed, that monomer may be present in the form of a particulate dispersion in the organic liquid; it is not essential that the particles be limited in size in the same way as the particles of the insoluble solid monomer. When a liquid monomer is employed in addition to the insoluble solid monomer, the liquid monomer may have either a limited solubility in the inert organic liquid medium or may be miscible therewith in all proportions. Where the liquid monomer has a limited solubility in the organic liquid, it may be present in the form of an emulsion.

By "an inert organic liquid" we mean an organic liquid which does not take part in the polymerisation reaction; it may be either a pure liquid or a mixture. Where the polymerisation reaction is of the condensation type in which a by-product, such as water or ethylene glycol, is eliminated, the inert organic liquid medium is preferably capable of forming an azeotrope with the by-product; where the liquid medium is a mixture, it will usually suffice if one of the constituents is so capable. Where high molecular weight polymer products are required, for example polymers suitable for fibre formation, it may be necessary to "force" the polymerisation reaction by deliberately removing the by-product from the azeotrope, e.g. by drying, freezing, or chemical methods.

The process of the invention may be employed for the manufacture of dispersions of modified particles of any of the common groups of addition polymers or copolymers where these are derived from at least one insoluble solid mponomer, for example monomers of the acrylic or vinyl type such as acrylamide and methacrylamide, monomers containing quaternary ammonium salt groups such as methacrylyloxyethyl trimethyl ammonium chloride and methacrylyloxymethyl amido ethyl imidazolidone. Such insoluble solid monomers may optionally be employed in conjunction with one or more soluble monomers of these types, for example acrylic and methacrylic acids and their lower esters, nitriles and amides, vinyl esters of monobasic acids such as vinyl acetate, and hydrocarbons such as styrene and vinyl toluene. The process may likewise be used for manufacturing dispersions of any of the well known groups of condensation polymers, such as polyesters, polyamides, polyurethanes (when obtained by reaction of a polyol with a polycarbamic ester), polyester amides, polycarbonates, polyamides, polyimidazoles and polyureas (when obtained by reaction of urea or a dicarbamic acid with a diamine), where either the insoluble solid monomer alone, or such a monomer in conjunction with one or more other soluble monomers, is involved and where the condensation reaction may occur either with or without the elimination of a by-product. Thus the process is of value in the manufacture of dispersions of polyesters from a high-melting polycarboxylic acid, such as adipic acid or terephthalic acid, by reaction with a polyhydroxy compound which may be liquid at the temperature of polymerisation, as for example ethylene glycol, propylene glycol, glycerol or trimethylolethane or pentaerythritol. In all of these reactions, water is elminated as a by-product. Alternatively the process may be used for making dispersions of polyesters from a single high-melting monomer such as p-hydroxybenzoic acid, where water is again eliminated, or from a monomer such as p-acetoxybenzoic acid or bis-p-hydroxy-phenyl terephthalate, where acetic acid or hydroquinone respectively is eliminated. Dispersions may likewise be made of polyesters from high-melting lactones, or of polyethers from trioxane, in which cases there is no by-product eliminated. Another application to polyester manufacture involves a single reactive monomer which cannot readily be brought to the molten state without premature onset of polymerisation, as for example bis(hydroxyethyl) terephthalate, during the polymerisation of which ethylene glycol is eliminated as a by-product. Likewise, the process may be employed for making dispersions of polyamides from monomers or intermediates at least one of which is high-melting, for example adipic acid together with hexamethylene diamine, or the adipic acid salt of hexamethylene diamine (Nylon 66 salt), or the azelaic acid salt of hexamethylene diamine (Nylon 69 salt); or from a monomer which has too high a polymerisation tendency for emulsification to be effected prior to reaction, such as most amino acids including 11-aminoundecanoic acid, where polymerisation can be carried out substantially below the melting point, whereby avoiding decomposition.

As examples of copolymers, modified despersions of which may be made from two insoluble, solid monomers by the present process, there may be mentioned a copolyamide derived from nylon 66 salt and 6-aminocaproic acid and a copolyesteramide derived from 11-aminoundecanoic acid and p-acetoxybenzoic acid.

Modifiers suitable for use in the process of the invention are materials which are solid at the temperature of the polymerisation reaction and include any of the variety of such solid materials which are commonly incorporated in particulate form in polymeric materials. Thus the modifier may be a substance which modifies the appearance of the polymer particles, such as a pigment a dyestuff insoluble in the polymer, a filler or an extender. Examples of such materials include titanium dioxide, forms of silica such as β-cristobalite, kaolin and cement. Alternatively, the modifier may be a substance having a biological action, for example a drug such as a steroid, a fungicide such as calcium sulphide or mercaptobenzimidazole, a herbicide, an insecticide or a fertiliser such as ammonium sulphate, for applications in which the polymer is gradually dissolved away under the ambient conditions, giving a slow release of the active material. Yet again the modifier may be a solid substance which modifies the electrical or magnetic properties of the particles, in particular by increasing their conductivity or capacity, such as metal particles, barium titanate and cuprous iodide.

It is of advantage, where the modifier is a pigment, filler or extender, to use a form of that material which is provided with a surface coating on the particles of such a nature that it can interact either with the dispersant of step (1) of the process, or with the monomer or monomers used, or with the polymer formed. In this way the initial dispersing of the modifier sub-particles and/or their efficient encapsulation in the polymer can be assisted. Thus, in Examples 1, 7 and 8 which follow, a form of rutile titanium dioxide is employed which has an amine surface coating on the particles. The amine groups are able to interact both with the carboxyl groups present in the dispersant used in each instance and also with the monomers from which the disperse polymers are formed.

The process is of particular value in cases where the modifier is an inorganic material, of which a number of illustrations have been given above.

The amount of the modifier incorporated in the polymer particles may vary from 0.1% to 90% by weight, based on the polymer.

Inert organic liquids which may be used in the process will in general be liquids which are free from reactive groups of the type involved in the polymerisation reaction. Thus in many cases aliphatic or aromatic hydrocarbons will be satisfactory, these being selected for maximum convenience to have boiling points at or above the polymerisation temperature, although it is of course possible to employ liquids which boil under atmospheric pressure at temperatures below that of polymerisation, by operating in pressure equipment.

The basis of the process of the invention is the initial procurement of a stable dispersion of the insoluble solid monomer or monomers and of the modifier in finely divided, particulate form, and the maintaining of this stably dispersed state throughout the subsequent polymerisation reaction.

In the first stage of the process, the solid monomer or monomers and the modifier are dispersed in an appropriate inert organic liquid by a grinding or milling procedure, such as by sand milling, in the presence of a suitable dispersing agent, until the mean particle size of the monomer and of the modifier, as determined by microscopy, is not greater than 50$\mu$, preferably in the range 0.1 - 10$\mu$. Since a solid monomer will in the majority of cases be a crystalline substance, the production of the desired fine particles of monomer will usually call for actual comminution or attrition of the coarser particles in which form the monomer is commercially supplied, but in suitable cases all that may be necessary is to re-disperse, by shearing action, flocculated or aggregated material which has been brought to the required primary particle size in a previous comminution step.

The modifier may likewise be brought to the desired particle size by either comminution or redispersion in the presence of the inert organic liquid. In many cases a comminution operation will be essential, but where the modifier is a pigment it may be sufficient to employ previously prepared particles of the required size. Whether or not both the solid monomer and the modifier are reduced to the required primary particles in this first stage of the process, it is an essential feature of the invention that the monomer and the modifier are subjected together in this stage to a common dispersing and/or comminuting action; it is not sufficient to make the primary dispersions of the monomer and the modifier separately and then merely blend the dispersions before carrying out the subsequent polymerisation step.

During this simultaneous dispersion or comminution of the solid monomer or monomers and the modifier, it is necessary that there be present a dispersing agent as previously defined, i.e. one which is capable of becoming associated with the particles of monomer. Optionally, there may be employed at the same time a second dispersing agent having the capability of becoming associated with the particles of the modifier. Alternatively, a single dispersing agent capable of becoming associated with the particles of both the solid monomer or monomers and the modifier may be used.

The amount of the monomer-dispersing agent used in the first stage of the process may be from 0.1% to 20% based on the total volume of the dispersed phase. For any given composition, depending on the particular monomer or monomers, modifying agent, dispersant and organic liquid present, there will be an optimum amount of dispersant such that the dispersion finally obtained will contain the maximum proportion of disperse particles consisting of single modifier particles such encapsulated in polymer; less dispersant than this optimum amount may result in a significant proportion of disperse particles which each contain several modifier particles, whilst more dispersant than the optimum amount tends to favour the production of additional particles which consist of unmodified polymer. The optimum amount of dispersant can readily be determined in any given instance by means of simple trials. In such trials, it is not always necessary to carry out the process of the invention in full in order to assess whether or not the amount of dispersant is correct; insufficient dispersant is revealed by a pronounced thickening of the mixture of solid monomer, modifying agent and organic liquid during the dispersion operation. If, on the other hand, the correct amount of dispersant is present, this mixture, prior to the polymerisation step, will have a viscosity not significantly higher than that of the organic liquid itself. Where thickening of the monomer/modifier dispersion is found to have occurred, it is always possible to add more dispersant and then continue the dispersion operation; the procedure may be repeated as often as necessary until microscopic examination of the dispersion shows that the desired particle size has been reached. It follows from the foregoing that it is preferable, when carrying out the dispersion operation on a composition for the first time, to make successive small additions of dispersant rather than to add a substantial amount all at once. Once the optimum amount of dispersant has been found, however, it is immaterial, in repeating the process on further batches of material, whether the addition of dispersant is made portionwise or in a single total amount.

If the reactive monomers, from which the polymer is to be derived, include not only a solid monomer as referred to above but also one or more monomers which are moderately soluble in the liquid medium at the polymerisation temperature, it is preferred that such a monomer should be incorporated with the insoluble solid monomer and the modifier during the grinding or milling process, but it may if desired be added to the dispersion of solid monomer and modifier in the form of a separate dispersion or emulsion. A liquid or solid monomer which is freely soluble in the liquid medium may be dissolved directly in the dispersion of the solid monomer and the modifier.

As already stated, the dispersing agent, whereby the insoluble solid monomer or monomers and the modifying agent are dispersed in the inert organic liquid prior to the polymerisation reaction incorporates a polymeric component which is of such a nature as to be solvatable in the liquid. Thus where the liquid medium is non-polar, for example an aliphatic hydrocarbon, the solvatable component will also require to be non-polar, for example a polymer chain of mainly hydrocarbon type such as a polymer of a long chain ester of acrylic or methacrylic acid, or of a vinyl ester of a long chain acid, or of a vinyl alkyl ether, or of ethylene, propylene, butadiene or isoprene, or of a hydroxyl group-containing long chain fatty acid, or of polybutylene oxide, or of poly-t-butyl styrene terminated with amine, hydroxyl, carboxyl or unsaturated groups, or polyisobutylene, polybutadiene or polyisoprene terminated with amine, hydroxyl or carboxyl groups. Where the liquid medium consists mainly of aromatic hydrocarbon, somewhat shorter chain analogues of these polymers may be employed, such as polymers of methyl or ethoxyethyl methacrylate, ethyl acrylate, styrene or vinyl toluene. Where the liquid medium is weakly polar, e.g. a higher alcohol, ketone or ester, suitable solvatable components include aliphatic polyethers, polyesters from short-chain difunctional acids and alcohols, short-chain alcohol esters of acrylic or methacrylic acids, and polymers of short-chain hydroxyacids. If a strongly polar liquid medium is employed, such as methyl or ethyl alcohol, the solvatable components may consist of polymers of acrylic or methacrylic acids, ethylene oxide or vinyl pyrrolidone, polyvinyl alcohol or polymers of glycerol or glycol mono-methacrylates.

The dispersing agent is also required to contain a grouping which is capable of becoming associated with the surface of the particles of the solid monomer or monomers, in order that the solvatable polymeric components discussed in the preceding paragraph may become effectively "anchored" to, and so stabilise, the monomer particles in the liquid medium. Such groupings may be either polymeric or non-polymeric in character. When non-polymeric, they will be either polar groups which are capable of interacting with polar groups present in the solid monomer or groups which are capable of reacting chemically with groups in the monomer. For example, in the case of a monomer which is an acid, e.g. methacrylic acid, adipic acid or terephthalic acid, suitable polar groups include carboxylic acid, sulphonic acid, tertiary amine, quaternary ammonium salt, nitrile, p-nitrobenzoate, amide, methylol or alkoxymethyl groups; suitable chemically reactive groups include primary and secondary amine, epoxide, anhydride, isocyanate and hydroxyl groups. Where the solid monomer is a hydroxy compound, e.g. trimethylolethane or pentaerythritol, amide, ester, methylol, alkoxymethyl or hydroxyl groups may similarly be employed as polar anchoring groups and epoxide, anhydride or isocyanate groups as chemically reactive anchoring groups.

Where the groupings capable of associating with the solid monomer particles are polymeric in character, the necessary anchoring force is supplied by the multiplicity of repeat units in the polymer chain, but all or some of those units may, if desired, in addition carry groups which are capable either of polar-polar interaction or of chemical reaction with groups present in the monomer, such as those groups discussed above. Monomer-dispersing agents which contain polymeric anchoring groupings are preferred for use in the present invention. Such agents are thus graft copolymers, and a particularly preferred class of agents contains a non-solvatable polymeric backbone to which a plurality of solvatable components are attached as pendant groups and which also carries a plurality of polar-active or chemically reactive groups as described above. British Pat. Specifications Nos. 1,122,397 and 1,143,404 (corresponding to U.S. Pat. Nos. 3,514,500 and 3,691,123, respectively) may be referred to for descriptions of the general principles involved here. It is further preferred that the polymeric backbone in such a structure should be flexible, rather than rigid, under the conditions of dispersing the solid monomer or monomers in the inert organic liquid in the presence of the dispersing agent, following the principles laid down in British Patent Specification No. 1,206,398 (corresponding to U.S. Pat. No. 3,701,747) in relation to the dispersion in organic liquids of preformed particles of polymers. As indicated in the latter specification, flexibility of the "anchor backbone" may be achieved by carrying out the step of dispersing the solid monomer at a temperature which is above the glass transition temperature of the polymeric backbone, or by choosing the composition of the backbone so that its glass transition temperature lies below the normal ambient temperature.

Substantially the same considerations apply in selecting a second dispersing agent which is capable of associating with the particles of the modifier, where such a second agent is employed, or in choosing a single dispersing agent which is capable of associating with the particles of both solid monomer and modifier. In many instances, however, a grouping which serves to associate with the monomer will also be directly suitable for associating with the modifier, so that, as already indicated, a separate modifier-dispersing function is superfluous.

In the second stage of the process of the invention, the dispersion of the inert organic liquid of the insoluble solid monomer and the modifier is heated at the polymerisation temperature, together with any remaining soluble monomers, and any polymerisation catalyst, if required, in the presence of a stabilising agent which is capable of stabilising in the organic liquid the particles of the resulting polymer as they are formed. This stabilising agent is required to comprise a polymeric component which is solvatable by the organic liquid and also a grouping which is capable of effecting association between the stabilising agent and the surface of the particles of polymer formed.

In general, the polymer-stabilising agent may be of a similar nature to the monomer-dispersing agent previously described. Thus the solvatable polymeric group may be of a similar type, or may even be identical with, the solvatable polymeric group present in the monomer-dispersing agent. Likewise, the grouping whereby the polymer-stabilising agent is caused to associate with the polymer particles may be similar to or identical with the anchoring groups already referred to whereby the monomer-dispersing agent is caused to associate with the solid monomer particles; this is especially the case where the nature of the polymerisation reaction is such that there is no great disparity in polarity between the insoluble solid monomer and the polymer formed therefrom. The polymer-associating grouping of the stabilising agent may, therefore, in general be either polymeric or non-polymeric. When non-polymeric, it will usually require to be a polar group capable of strong interaction with a complementary polar group present in the disperse polymer being formed. Preferably the polar-associating grouping of the stabilising agent is polymeric in nature. A particularly preferred class of polymer-stabilising agent comprises graft copolymers which contain a plurality of solvatable components attached as pendant groups to a non-solvatable polymeric backbone to which are also attached a plurality of polar or chemically reactive groups capable of interacting with groups present in the polymer. In particular, chemically reactive groups so incorporated in the polymer-stabilising agent can be utilised to generate, during the course of the polymerisation reaction, an additional associating force between the stabilising agent and the disperse polymer. This is done by arranging that the reactive groups can participate in the polymerisation reaction and so give rise to a polymer chain of similar composition to that of the main polymer, grafted on to the stabiliser molecule. The reactive grouping must be capable of reacting with a polymerisable grouping contained in at least one of the monomers from which the polymer is formed. Thus in the case where the final polymer is a polyester, the reactive grouping of the stabiliser should be capable of reacting either with hydroxyl groups or with carboxylic acid groups; it may, therefore, be a carboxyl group, an epoxide group, a hydroxyl group or an amino group; where the final polymer is an addition polymer, the reactive grouping of the stabiliser may be an ethylenically unsaturated grouping, as described in British Patent Specification No. 1,231,614 (corresponding to U.S. Pat. No. 3,607,821).

As indicated in the British Specification Nos. 1,122,397 and 1,143,404 referred to earlier in connection with the monomer-dispersing agent, the polymeric backbone of the polymer-stabilising agent may conveniently be an addition polymer chain; thus a suitable backbone in many cases may consist of units of an acrylic or methacrylic ester, for example methyl methacrylate. However, in order to avoid too high a degree of participation of the polymer-stabilising agent in the polymerisation reaction, it may be desirable (where the polymer-stabilising agent contains deliberately introduced copolymerisable groups) that the polymer backbone should be inert towards the polymerising species. Thus, where the process of the invention is used for preparing a dispersion of modified polyamide particles from a diamine and a dicarboxylic acid, such as Nylon 6,6 from hexamethylene diamine and adipic acid, a polystyrene backbone in the stabiliser may be preferred to one based on polymethyl methacrylate since the free diamine present can react with the pendant ester groupings of the acrylic polymer. If the stabiliser already contains carboxylic acid groups capable of taking part in the polyamide-forming reaction, the effect of this additional participation of the ester groups may be to produce a disperse polymer which is crosslinked and infusible.

The amount of the polymer-stabilising agent used in the second stage of the process may be from 0.1% to 20% based on the total volume of the dispersed phase.

The polymer-stabilising agent may be added to the dispersion in the organic liquid of the insoluble, solid monomer and the modifier after production thereof and before heating to the polymerisation temperature is commenced. Alternatively, the polymer-stabilising agent may be initially present, along with the monomer-dispersing agent and, if present, the modifier-dispersing agent, during the formation of the dispersion of the insoluble solid monomer and modifier. In a preferred embodiment of the invention, the monomer-dispersing agent and the polymer-stabilising agent are one and the same substance, in which case the dispersing agent which is added in the first dispersion stage of the process comprises (i) a solvatable polymeric component, (ii) a grouping capable of anchoring the agent to the particles of solid monomer, and (iii) a grouping capable of effecting association of the agent with the particles of polymer formed, these three components having the characteristic already described. It will be apparent from what has been stated above that the groupings (ii) and (iii) may in suitable cases by identical. Where this grouping itself carries polar-active or chemically reactive groups, it is desirable, whilst ensuring that the total proportion of such groups provided is adequate to perform their intended functions, to avoid introducing so many such groups that they can bring about an appreciable degree of cross-linking of the polymer. It is further desirable to select the anchor groups and/or the reactive groups so that they do not tend to associate too strongly with themselves, otherwise undissociatable micelles of dispersing agent/stabiliser may be produced which will considerably reduce the stabilisation efficiency. The reactive group is preferably capable of participating in the polymerisation in its early stages, so that there is stabilisation of oligomer formed as well as of higher polymer. This applies particularly in cases where a by-product is formed in a condensation polymerisation reaction, owing to the continuous change in polarity within the particles of reacting intermediates which occurs as the by-product diffuses out and escapes from the system. However, it is also significant in addition polymerisations or in condensation polymerisations when no by-product is formed, since the change in polarity within the particle in the initial stages of polymerisation may still be great enough to call for simultaneous stabilisation.

Reactive groups capable of participating in the polymerisation reaction, if present in the dispersing/-stabilising agent, are preferably located in a portion of the molecule which is remote from the solvatable component or from a grouping which is responsible for association with the particles of the insoluble solid monomer, and it is desirable, though not essential, that the reactive groups should be attached to that portion of the molecule in such a way as to be sterically readily accessible. If potentially reactive groups are present in the solvatable component of the stabiliser or in proximity to an anchoring group, they should be sterically shielded or hindered.

Where one and the same substance is used as both monomer-dispersing agent and polymer-stabilising agent, it is not essential that it should all be introduced in step (1) of the process; if desired, a portion of it may be introduced at the beginning of step (2).

Types of dispersing/stabilising agent useful in the process of the invention include copolymers of three different types: (i) block copolymers of the AB or ABA type, where A represents the solvatable polymeric component and B represents the polymeric grouping whereby the copolymer is associated with the particles of the disperse polymer; (ii) graft copolymers in which a plurality of solvatable polymeric chains are attached to a common polymeric backbone which can associate with the disperse polymer; and (iii) random copolymers which contain groupings which can associate with the polymer. In each of these cases there must be present groups which are capable of associating with the particles of insoluble solid monomer; these may, as already indicated, be the same as the groupings which associate with the final polymer or they may be groupings specially incorporated for the purpose. Optionally, there may also be present separate groups having the capability of associating with the particles of modifier.

Examples of stabilising agents according to the foregoing description which are capable of performing both monomer-dispersing and polymer-stabilising functions in the preparation of dispersions of modified polymer particles, especially of polyesters, polyamides or polyesteramides, include the following:- (a) a graft copolymer of which one polymeric component is a residue derived from poly(12-hydroxy stearic acid) and another polymeric component is a copolymer of ethyl acrylate with a minor proportion of methacrylic acid; (b) a graft copolymer of which one polymeric component is a lauryl methacrylate polymer and another polymeric component is an ethyl acrylate copolymer as described in (a); (c) a graft copolymer of which one polymeric component is a poly(12-hydroxystearic acid) residue and another polymeric component is a copolymer of styrene with a minor proportion of methacrylic acid.

When the process of the invention is used for making condensation polymers, and more than one reactive monomer is involved in the polymerisation, the relative proportions of the monomers taken may be selected according to the principles commonly followed in bulk condensation polymerisation. That is to say, when it is desired that the final polymer should have chains terminated by groups of one of the two reactive species involved in the condensation reaction, an excess of the monomer bearing those groups will be employed, whilst if a high molecular weight polymer of fibre-forming capabilities is required strict stoichiometry of the initial monomers will be observed.

Both condensation and addition polymers produced as stable dispersions by the process of the invention may be cross-linked if desired through the inclusion of polyfunctional reactants, as is well-known in the art. Thus, in the case of a polyamide, a cross-linked polymer may be obtained by incorporating into the polymerising composition a minor proportion of a polyamine such as diethylene triamine, or of a polybasic acid such as 1, 3, 5-benzenetricarboxylic acid.

The particles of disperse, modified polymer produced according to the invention may be separated if desired by evaporation, decantation, filtration or centrifugation, where necessary preceded by flocculation of the particles by altering the nature of the continuous phase of the dispersion so that it is no longer capable of solvating the previously solvated components of the polymer-stabilising agent.

Electron microscopic examination of the dispersions obtained by the present process clearly reveals the presence of particles consisting of polymer containing one or more subparticles of the modifier. Particles of modifier not associated with any polymer do not occur, and very few particles of polymer not associated with modifiers are found provided that a substantial excess of stabiliser/dispersant is not used.

Although the modifier is thus held within each particle of the disperse phase by mechanical action of the surrounding polymer, the bonding between the modifier and the polymer may if desired by increased by incorporating in the particles an adhesion promoter or interfacial bonding agent, for example one of the silane derivatives containing polymerisable groups which are frequently used for improving the bond between an inorganic filler or modifier and a polymer matrix, for example γ-aminopropyltriethoxysilane. Such a bonding agent may be introduced during the operation of dispersing the solid monomer and the modifier in the organic liquid.

Applications of the dispersions obtained by the present process, and of the particles derived therefrom, are numerous. Where the modifier is a pigment or dyestuff, for example, the dispersions may be used for the "masterbatch" tinting of liquid compositions containing polymers; alternatively, the separated disperse particles may be used analogously for tinting bulk polymer. In paints, the dispersions or the derived particles will give improved pigment utilisation by reducing the tendency of pigments, such as titanium dioxide, to flocculate; the paint films obtained thereby will possess improved properties such as opacity and scrub resistance. Where the modifier is a filler, the particles separated from the dispersions may be employed as moulding powders in their own right for the fabrication of useful articles, e.g. by compression moulding.

In those cases where the modifier is a substance capable of modifying the electrical or magnetic properties of the particles, the latter, after separation from the dispersion in which they are made, may be used for fabricating articles having, for example, improved electrical conductivity.

Where the modifier is a biologically active substance, such as a drug, an insecticide, a herbicide, a fungicide or a fertiliser, its incorporation within polymer particles by means of the process of the invention provides a useful method of achieving slow release of the substance in a biological system, by arranging for the polymer to be slowly dissolved under the ambient conditions.

EXAMPLE 1

The following ingredients were charged to a ball mill:-

| | |
|---|---|
| Aliphatic hydrocarbon (boiling range 170 – 210° C) | 1285 g |
| 11-Aminoundecanoic acid | 314 g |
| Titanium dioxide (RCR3 grade ex British Titan Products; particle size 0.2μ) | 314 g |
| Graft copolymer dispersant solution (as described below) | 34 g |

The charge was ground for 92 hours, when the contents of the mill had become very viscous and immobile. A further 51 g of the dispersant solution was added, together with 502 g of the hydrocarbon, and milling was continued for 1 hour more. The product was a fluid dispersion having a mean particle size (determined optically) of about 1μ; it was not possible to distinguish optically separate particles of the monomer and the titanium dioxide, and electron microscopy showed a high degree of association between the two materials.

A laboratory reactor fitted with stirrer, thermometer and Dean and Stark separator was then charged with 2250 g of the above dispersion. The contents of the reactor were heated to reflux temperature (initially about 170° C) and 26 g of water of reaction were removed over a period of 35 minutes (final reflux temperature, 183° C). The batch was rapidly cooled by being pumped through a heat exchanger. The product obtained was a fluid dispersion which by optical microscopy was found to have a particle size of about 1μ or less. Electron photomicrographs taken at a magnification of 20,000 clearly showed the dispersion to consist of particles of diameter 0.3–1.5μ, with all the titanium dioxide encapsulated by nylon 11 polymer. Apart from a very small proportion (estimated at 1 – 2% of the particles), all of the polymer was seen to be associated with pigment. Combustion analysis of a filtered, dried sample of the disperse phase showed the particulate material to contain 47% by weight of incombustible material, viz. $TiO_2$; the expected value was 49%.

The graft copolymer dispersant solution used in this Example was a 37% by weight solution in the aliphatic hydrocarbon described above of a poly-(12-hydroxystearic acid)-g-poly (ethylacrylate-co-methacrylic acid) copolymer, 50/45/5 w/w/w. This was obtained by reacting poly(12-hydroxystearic acid) of acid value 31 – 34 mg KOH/g with glycidyl methacrylate until the product had substantially zero acid value, then copolymerising the resulting ester at a ratio of 1:1 by weight with a mixture of ethyl acrylate and methacrylic acid in the weight proportions of 90:10.

EXAMPLE 2

The following ingredients were charged to a 2-gallon laboratory ball mill together with the requisite quantity of ⅜ inch steatite balls:-

| | |
|---|---|
| Nylon 6:6 salt | 550 g |
| Barium titanate, capacitor grade | 2750 g |
| Aliphatic hydrocarbon, (boiling range 230 – 250° C) | 1100 g |
| Graft copolymer dispersant solution as described below | 18 g |

The charge was ground for 50 hours, at the end of which period the charge had become almost immobile. A further 24 g of dispersant solution and 1150 g of hydrocarbon were added. Milling was then continued for 1 hour more, after which the grinding medium was separated; the remainder of the contents of the mill was a fluid dispersion which microscopical examination showed to have a particle size of 0.5 – 2μ. It was not possible to identify distinct particles of barium titanate and nylon salt respectively. To a laboratory reactor fitted as in Example 1, 5500 g of this dispersion was charged and heated to reflux temperature (about 180° C at first). Over a period of 1 hour, 99 g of water was removed, the final reflux temperature being about 240° C. On cooling, the product was found to be a fluid dispersion of particles of size 2 – 5μ. Although, due to the high density of the particles, they settled rapidly when no longer agitated, gentle stirring of the product brought about immediate redispersion to give a fine, uniform dispersion.

Gravimetric assay indicated that the particles contained 84.7% by weight of barium titanate, equivalent to 49.6% by volume. On filtering and drying the product, a fusible particulate material was obtained.

The graft copolymer dispersant solution used in this Example was a 52% solution in aliphatic hydrocarbon of boiling range 170° – 210° C of poly(12-hydroxystearic acid)-g-poly (styrene-co-methacrylic acid) copolymer, 50/45/5 w/w/w.

EXAMPLE 3

The following ingredients were charged to a 2-pint size laboratory ball mill, together with the requisite amount of ⅜ inch steatite balls:-

| | |
|---|---|
| Nylon 6:6 salt | 32 g |
| Cuprous iodide | 180 g |
| Aliphatic hydrocarbon (boiling range 230 – 250° C) | 101 g |
| Graft copolymer dispersant solution (as described below) | 3 g |

The charge was milled for 23 hours, following which the charge was observed to have thickened and flocculated. A further 1.5 g of dispersant solution and 200 g of the hydrocarbon were added. After a short further period of milling, the charge was separated from the grinding medium. To a laboratory reactor fitted as in Example 1 was charged 477 g of this separated material; the latter was heated to reflux temperature (about 180° C at first) and over a period of 1½ hours 4 g of water was removed. (The final reflux temperature was about 240° C). The batch was allowed to cool and the product was found to be a fluid dispersion of particle size 2 – 8μ. Gravimetric assay indicated an ash content of 35.5% by weight of brownish-black cupric oxide. From this result it was calculated that the disperse phase of the product was nylon 6:6 containing 85% by weight of cuprous iodide (equivalent to 50.2% by volume).

The graft copolymer dispersant solution used in this Example was a 34% solution in the aliphatic hydrocarbon of the same copolymer as was used in Example 2.

EXAMPLE 4

The following ingredients were charged to a 2-gallon ball mill together with the requisite quantity of ⅜ inch steatite balls:

| | |
|---|---|
| Nylon 6:6 salt | 314 g |
| β-Cristobalite (flour grade, particle size 1 – 15 μ) | 314 g |
| Aliphatic hydrocarbon (boiling range 230 – 250° C) | 1285 g |
| Graft copolymer dispersant solution (as described in Example 2) | 24 g |

The charge was milled for 42 hours. The charge was then found to have slightly thickened, and a further 12 g of dispersant solution was added and milling continued for a further short period. The charge was separated from the grinding medium and 1750 g of the separated material was transferred to a laboratory reactor equipped as in Example 1. The contents of the reactor were heated to reflux temperature (initially about 185° C) and 40 g of aqueous distillate were removed (the final reflux temperature was about 235° C). The product was a fluid dispersion of particle size 2 – 25μ. By filtration and drying, the particulate material, consisting of β-cristobalite-modified nylon 6:6 was separated from the dispersion and was found to be convertible to moulded articles, for example by compression moulding.

EXAMPLE 5

The following ingredients were charged to a 2-gallon ball mill together with the requisite quantity of ⅜ inch steatite balls:

| | |
|---|---|
| 11-Aminoundecanoic acid | 119 g |
| Fine Alag Ciment Fondu (trade name of Lafarge Alumina Cement Company) | 1070 g |
| Aliphatic hydrocarbon (boiling range 170 – 210° C) | 1285 g |

The charge was subjected to a short initial period of milling, and 41 g was then added of a 43% solution in the aliphatic hydrocarbon of the graft dispersant co-polymer described in Example 1. The combined charge was then milled for a total of 136 hours, during which two further additions of 15 g each of the dispersant solution were made. The grinding medium was then separated. There was then transferred, to a reactor fitted as in Example 1, 2335 g of the resulting dispersion. The latter was heated to reflux temperature (initially about 165° C) and over about 30 minutes 4 g of aqueous distillate was removed (the final reflux temperature was about 175° C). On cooling, the batch was found to be a stable, fluid dispersion, of particle size 0.1 – 1µ, the particles consisting of nylon 11 containing sub-particles of the ciment fondu.

EXAMPLE 6

The following ingredients were charged to a 2-gallon ball mill together with the requisite quantity of ⅜ inch steatite balls:

| | |
|---|---|
| 11-Aminoundecanoic acid | 314 g |
| β-Cristobalite (coarse ground, 100µ) | 314 g |
| Aliphatic hydrocarbon (boiling range 170 – 210° C) | 1285 g |
| Graft copolymer dispersant solution (as described in Example 1) | 200 g |

The charge was milled for 160 hours. The charge was separated from the grinding medium and 1800 g of the separated material was transferred to a laboratory reactor equipped as described in Example 1. In addition a further 27 g of graft copolymer dispersant solution and 200 g of aliphatic hydrocarbon were added to the reactor. The contents of the reactor were heated to reflux temperature (initially 160° C) and 24 g of aqueous distillate were removed (the final reflux temperature was 182° C). On cooling, the product was a fluid dispersion of particles (size 0.2 – 1µ) of nylon 11 containing 50% by weight of β-Cristobalite (as shown by gravimetric assay).

EXAMPLE 7

The following ingredients were charged to a 2-gallon laboratory ball mill together with the requisite quantity of ⅜ inch steatite balls:

| | |
|---|---|
| Nylon 6:6 salt | 314 g |
| Titanium dioxide (RCR3 grade, ex British Titan Products: 0.2µ particle size) | 314 g |
| Aliphatic hydrocarbon (boiling range 170 – 210° C) | 1285 g |
| Graft copolymer dispersant solution (as described below) | 25 g |

The charge was ground for 26 hours, during which time the contents of the mill became flocculated. Grinding was continued for a further 70 hours, at the end of which period the charge was found to be highly flocculated. A further 38 g of dispersant solution was added and grinding continued for 10 minutes more, whereupon the batch became fluid; after addition of a further 502 g of aliphatic hydrocarbon, the contents of the mill were discharged. The product was a fluid dispersion of particles of nylon 6:6 salt and titanium dioxide of size 0.2 – 2µ (by microscopic examination).

The dispersion (2200 g) was converted to pigmented polymer by heating under reflux in an apparatus as described in Example 1. The first separation of water occurred at 160° C, and a total of 40 g of water was collected over 1½ hours, the final reflux temperature being 188° C. After cooling, examination by optical microscope of the fluid dispersion thus obtained showed it to have a particle size of 0.2 – 2µ and electron microscopy showed that each particle consisted of one or more pigment particles (depending on their size) encapsulated with nylon 6:6. There were no identifiable particles of pigment only or of polymer only.

The graft copolymer dispersant solution used in the above procedure was made as follows. A mono-carboxyl-terminated poly(lauryl methacrylate) was prepared, according to the teaching of British Pat. No. 1,096,912, by polymerising lauryl methacrylate in the presence of thioglycollic acid as chain transfer agent and azo-bis(-cyanovaleric acid) as initiator. The resulting polymer had an acid value of 7.4 mg KOH/g, indicating $M_n$ = 9,500. This polymer was reacted with glycidyl methacrylate in the presence of lauryl dimethylamine in order to introduce functional methacrylate groups, and a graft copolymer was then made by copolymerising this latter product with ethyl acrylate and methacrylic acid in an aliphatic hydrocarbon diluent and in the presence of a suitable initiator. The final product was a 45% solution in the hydrocarbon of 50/45/5 w/w/w poly(lauryl methacrylate)-g-poly(ethyl acrylate-co-methacrylic acid).

EXAMPLE 8

The following ingredients were charged to a 1-gallon laboratory ball mill together with the requisite quantity of ⅜ inch steatite balls:

| | |
|---|---|
| p-Acetoxybenzoic acid | 169 g |
| Titanium dioxide (RCR3 grade, ex British Titan Products: 0.2µ particle size) | 169 g |
| Graft copolymer dispersant solution (as in Example 1) | 14.2 g |
| Aliphatic hydrocarbon (boiling range 170 – 210° C) | 691 g |

The charge was ground for 26 hours, after which inspection showed it to be flocculated. After a further 70 hours' grinding, the batch was well flocculated. On addition of a further 21 g of dispersant solution together with 270 g of hydrocarbon, it became fluid and was removed from the mill. Optical microscopic examination showed the dispersion of monomer and pigment to have a particle size of 0.2 – 1µ.

The dispersion (1250 g) was transferred to a reactor of the kind described in Example 1 and heated at reflux temperature. Initially refluxing occurred at 170° C and the temperature then rose to 184° C over a period of four hours, during which time 50 g of acetic acid was removed azeotropically. On cooling, the product was found by electron microscopy to consist of composite particles of titanium dioxide pigment encapsulated by poly(p-hydroxybenzoate), the particle size range being 0.2 – 1μ with a substantial proportion of particles at the lower end of this range.

EXAMPLE 9

The following ingredients were charged to a 1-gallon laboratory ball mill together with the requisite quantity of ⅜ inch steatite balls:

| | |
|---|---|
| Cuprous iodide | 900 g |
| Nylon 6:6 salt | 112 g |
| Caprolactam | 48 g |
| Dispersant solution (as in Example 1) | 11 g |
| Aliphatic hydrocarbon (boiling range 190 – 210° C) | 505 g |

The charge was ground for 48 hours, when on inspection it was found to be flocculated. An addition of 5 g of dispersant solution was made and grinding continued for a further 24 hours. A further 5 g of dispersant solution together with 500 g of the hydrocarbon were then added and the batch was removed from the mill. The product was a fluid dispersion, of particle size about 1μ, of the cuprous iodide, the nylon 6:6 salt and the caprolactam.

The above dispersion (2222 g) was transferred to a laboratory reactor as described in Example 1, where it was heated to reflux. An appreciable proportion of the caprolactam had then dissolved in the hydrocarbon, and that proportion of it which remained undissolved was now in a molten condition. The nylon 6:6 salt, however, was still present as solid particles.

The reflux temperature was initially 170° C and finally 191° C, 15 g of water having been azeotropically removed in the meantime over a period of 1½ hours. On cooling, the product was found to be a fluid dispersion of composite particles consisting of cuprous iodide encapsulated by nylon 6/6:6 copolymer, the particle size being 1 – 5μ.

EXAMPLE 10

The following ingredients were charged to a 2-gallon laboratory ball mill together with the requisite quantity of ⅜ inch steatite balls:

| | |
|---|---|
| Nylon 6:6 salt | 157 g |
| 6-Aminocaproic acid | 157 g |
| Titanium dioxide (RCR2 grade ex British Titan Products) | 314 g |
| Aliphatic hydrocarbon (boiling range 170 – 210° C) | 1285 g |
| Dispersant solution (as in Example 1) | 26 g |

The charge was ground for 68 hours, after which time it had flocculated. An additional 26 g of dispersant solution and 502 g of aliphatic hydrocarbon were added, whereupon the mill contents became fluid and were discharged. The product was dispersion of particles of the two monomers and of the titanium dioxide, the size range being about 0.5 – 1μ.

This dispersion (2360 g) was transferred to a laboratory reactor of the type described in Example 1 along with a further 26 g of dispersant solution. The reactor contents were heated with stirring to reflux, the temperature being initially 162° and rising to 185° C over a period of 2 hours during which 45 g of water was removed azeotropically. On cooling, the product was found by electron microscopy to be a fluid, non-flocculated dispersion of pigment particles encapsulated either singly or in groups by nylon 6:6/6 copolymer. It was estimated from the electron micrograph that over 98% of the particles consisted of pigment associated with polymer, only about 1% being free pigment and a similar proportion free polymer.

What we claim is:

1. A process for the manufacture of a stable dispersion in an inert organic liquid medium of particles consisting of (a) a polymer which is insoluble in that medium, the polymer being obtained by the polymerisation of one or more reactive monomers at least one of which (hereinafter referred to as an insoluble solid monomer) has a melting point above the temperature at which the polymerisation reaction takes place and is insoluble in the liquid medium at that temperature, and from 0.1% to 90% by weight, based on the polymer, of (b) sub-particles within the polymer of a modifying agent for the polymer which is solid at the polymerization temperature, the process comprising the steps of (1) dispersing the solid monomer or each solid monomer and the modifying agent together in the inert organic liquid medium in the presence of 0.1% to 20%, based on the total volume of the dispersed phase, of a dispersing agent for the monomer or monomers so as to produce a stable dispersion of particles of the monomer or monomers and of the modifying agent having a mean diameter not greater than 50μ, the dispensing agent being soluble in the inert organic liquid and incorporating (i) a polymeric component which is solvatable by the liquid and (ii) a grouping which is capable of becoming associated with the surface of the particles of solid monomer or monomers and (2) heating the dispersion of solid monomer or monomers and modifier at the polymerisation temperature so as to bring about the polymerisation reaction, in the presence of a polymer-stabilising agent which is soluble in the inert organic liquid and incorporates (a) a polymeric component which is solvatable by the liquid and (b) a grouping which is capable of effecting association with the surface of the particles of the resulting polymer as the polymer is formed.

2. A process as claimed in claim 1, wherein the monomer or monomers used give rise to a condensation polymer.

3. A process as claimed in claim 2, wherein the condensation polymer is a polyester, a polyamide or a polyesteramide.

4. A process as claimed in claim 2, wherein any by-product of the polymerisation reaction is capable of forming an azeotrope with the inert organic liquid medium or with a constituent thereof.

5. A process as claimed in claim 1, wherein the modifier is a pigment, a filler or an extender for the polymer.

6. A process as claimed in claim 1, wherein the modifier is a substance which modifies the electrical or magnetic properties of the polymer particles.

7. A process as claimed in claim 5, wherein the pigment, filler or extender sub-particles are provided with a surface coating of such a nature that it can interact either with the dispersant of step (1) of the process, or with the monomer or monomers used, or with the polymer formed.

8. A process as claimed in claim 1, wherein the amount of the modifier incorporated in the polymer particles is from 0.1% to 90% by weight, based on the polymer.

9. A process as claimed in claim 1, wherein the mean particle size of the monomer or monomers and of the modifying agent in the dispersion obtained in step (1) of the process is in the range 0.1 – 10μ.

10. A process as claimed in claim 1, wherein the amount of the monomer-dispersing agent used in step (1) of the process is from 0.1% to 20% based on the total volume of the dispersed phase.

11. A process as claimed in claim 1, wherein the grouping in the monomer-dispersing agent which is capable of becoming associated with the surface of the particles of solid monomer or monomers is a polymeric grouping.

12. A process as claimed in claim 11, wherein the monomer-dispersing agent contains a polymeric backbone to which a plurality of solvatable components are attached as pendant groups and which also carries a plurality of groups which are either polar groups capable of interacting with polar groups present in the solid monomer or groups capable of reacting chemically with groups in the monomer.

13. A process as claimed in claim 12, wherein the polymeric backbone of the monomer-dispersing agent is flexible under the conditions of dispersing the solid monomer or monomers in the inert organic liquid.

14. A process as claimed in claim 1, wherein the amount of the polymer-stabilising agent used in step (2) of the process is from 0.1% to 20% based on the total volume of the dispersed phase.

15. A process as claimed in claim 1, wherein the solvatable polymeric component of the polymer-stabilising agent is of a similar type to the solvatable polymeric group of the monomer-dispersing agent.

16. A process as claimed in claim 1, wherein the grouping of the polymer-stabilising agent which effects association with the polymer particles is a polymeric grouping.

17. A process as claimed in claim 16, wherein the polymer-stabilising agent contains a polymeric backbone to which a plurality of solvatable components are attached as pendant groups and to which are also attached a plurality of chemically reactive groups capable of participating in the polymerisation reaction.

18. A process as claimed in claim 1, wherein there is used a single stabilising agent capable of acting as both monomer-dispersing agent and polymer-stabilising agent, the agent comprising (i) a solvatable polymeric component, (ii) a grouping capable of anchoring the agent to the particles of solid monomer and (iii) a grouping capable of effecting association of the agent with the polymer formed.

19. A process as claimed in claim 18, wherein the groupings (ii) and (iii) are identical.

20. A process as claimed in claim 19, wherein the single stabilising agent is a graft copolymer of which one polymeric component is a residue of poly(12-hydroxystearic acid) or of poly(lauryl methacrylate) and another polymeric component is a copolymer of ethyl acrylate with a minor proportion of methacrylic acid.

21. A process as claimed in claim 19, wherein the single stabilising agent is a graft copolymer of which one polymeric component is a residue of poly(12-hydroxystearic acid) and another polymeric component is a copolymer of styrene with a minor proportion of methacrylic acid.

22. A stable dispersion of modified polymer particles whenever prepared by a process as claimed in claim 1.

* * * * *